(12) United States Patent
Bruder et al.

(10) Patent No.: US 8,639,003 B2
(45) Date of Patent: Jan. 28, 2014

(54) METHOD FOR THE NOISE REDUCTION OF CT IMAGE DATA AND IMAGE PROCESSING SYSTEM

(75) Inventors: Herbert Bruder, Höchstadt (DE); Rainer Raupach, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 875 days.

(21) Appl. No.: 12/710,423

(22) Filed: Feb. 23, 2010

(65) Prior Publication Data

US 2010/0220912 A1 Sep. 2, 2010

(30) Foreign Application Priority Data

Feb. 25, 2009 (DE) .......................... 10 2009 010 501

(51) Int. Cl.
*G06K 9/00* (2006.01)

(52) U.S. Cl.
USPC .......................................................... 382/131

(58) Field of Classification Search
USPC .......................................... 382/131; 378/4–9
See application file for complete search history.

(56) References Cited

U.S. PATENT DOCUMENTS

| | | | |
|---|---|---|---|
| 6,775,400 B1 | 8/2004 | Simopoulos | |
| 7,636,413 B2 * | 12/2009 | Toth | 378/4 |
| 2004/0097802 A1 * | 5/2004 | Cohen | 600/411 |
| 2005/0190984 A1 | 9/2005 | Fischer et al. | |
| 2006/0235293 A1 | 10/2006 | Raupach et al. | |
| 2007/0189635 A1 * | 8/2007 | Borsdorf et al. | 382/275 |
| 2009/0161935 A1 | 6/2009 | Bruder et al. | |

FOREIGN PATENT DOCUMENTS

| | | |
|---|---|---|
| DE | 10305221 A1 | 8/2004 |
| DE | 102004008979 B | 12/2006 |
| DE | 102005012654 B4 | 12/2007 |
| DE | 102007061935 A1 | 6/2009 |

OTHER PUBLICATIONS

German Office Action dated Feb. 2, 2010.

* cited by examiner

*Primary Examiner* — Robert Morgan
*Assistant Examiner* — Kristine Rapillo
(74) *Attorney, Agent, or Firm* — Harness, Dickey & Pierce (57) ABSTRACT

Method for the noise reduction of CT image data and an image processing system are disclosed, with a scanning of an examination object and generation of at least two CT image data records each taking place on the basis of a different x-ray energy spectrum. In at least one embodiment, a break-down of the data image records into at least two broken-down image data records takes place in each instance, with a lowest local frequency band ($f^{(1)}$) with the index k=1 and at least one high local frequency band ($f^{(k)}$) with the index k=2 to N. In at least one embodiment, the determination of the noise into at least one of the image data records per x-ray energy spectrum and calculation of at least one new image data record takes place in each instance by using an unchanged broken-down image data record with the lowest local frequency band and an image data record, generated from a noise-minimized weighted combination of broken-down image data records, which originate from the scannings using different x-ray energy spectra.

14 Claims, 4 Drawing Sheets

METHOD FOR THE NOISE REDUCTION OF CT IMAGE DATA AND IMAGE PROCESSING SYSTEM

PRIORITY STATEMENT

The present application hereby claims priority under 35 U.S.C. §119 on German patent application number DE 10 2009 010 501.8 filed Feb. 25, 2009, the entire contents of which are hereby incorporated herein by reference.

FIELD

At least one embodiment of the invention generally relates to a method for the noise reduction of CT image data from a so-called "dual-energy CT-scan" or "multi-energy CT-scan". In particular, at least one embodiment relates to a method for the noise reduction of CT image data in which an object is scanned in a computed tomography system, which can resolve at least two different x-ray energy spectra and generates a computed tomographic sectional image or a volume data set per spectrum from the same spatial situation. At least one embodiment of the invention also generally relates to an image processing system for implementing at least one embodiment of the method.

BACKGROUND

With the scans implemented using dual or multi-energy CT systems, the primary objective is to extract the multi spectra information, which is contained in the image data from the different x-ray energy spectra. Low noise input images from the two spectra are needed herefor, since the pixel-related differences between the images of different spectra are relatively minimal. The reconstructions implemented for this purpose are nowadays generally implemented using very soft convolution kernels. A compromise is already accepted here between resolution and noise. Nevertheless the image noise is generally still too great for a meaningful dual or multi-energy evaluation.

It is known from the prior art to apply edge-containing noise reduction methods to the image data recorded with different spectra in order to process this CT image data. In respect of this method, reference is made by way of example to the publication DE 10 2004 008 979. The disadvantage of the procedure described there is that not all the information contained in the data is used, but any spectrum is instead considered to be an independent scan and is treated in respect of its noise reduction.

SUMMARY

In at least one embodiment of the invention, a method and/or an image processing system allows several items of CT image data of an object to be used on the basis of spectrally different x-ray scans, in order to reduce the existing noise in the CT image data throughout the whole spectrum without at the same time impairing the image intensity and/or multi-energy information.

The inventors have identified, in at least one embodiment, that in dual-energy CT-image data of two x-ray energy spectra, the spectrally specific differences can essentially be found in low local frequency bands, while the high frequency information is however ideally to be significantly correlated. However, a large part of the noise output is also found in the high frequencies. Accordingly, the image data can be divided into individual frequency bands, in respect of its spatial frequencies, the image portions of the high frequency bands can be examined in respect of their noise behavior throughout the whole spectrum on the basis of cross correlation examinations and a noise optimization can be implemented here, while low frequency image portions remain untouched. Finally, the unchanged low frequency image portions with the noise-optimized image portions can be added up for each spectrum to form a complete image.

This allows the noise to be significantly reduced and the spectral-specific image information to be largely retained. In at least one embodiment, the method is particularly effective if the noise of the image data recorded using different x-ray spectra differs significantly. In practice, the noise of the image data from the low energy spectrum is in most cases considerably higher than the noise of the image data from the high energy spectrum.

This previously illustrated basic principle can be utilized by the following method with the four main steps I to IV. For simplification purposes, only one axial layer is observed, which was scanned with two different x-ray energy spectra A and B and reconstructed with two image data records $I_A$ and $I_B$. Based on this example, the person skilled in the art is able to synonymously transfer the described method to corresponding volume image data from dual-energy scans and/or to multi-energy scans.

Both image data records $I_A$ and $I_B$ show the same spatial information, even if with a different contrast and are statistically independent, with the index A representing the spectrum with low average energy and index B representing the spectrum with high average energy.

Step I: Here the two images $I_A$ and $I_B$ are broken down into two or more frequency bands $I_A^{(k)}$ and/or $I_B^{(k)}$, for instance using filters $F_k$ (k=1, ..., N; N≥2), i.e.

$$I_A^{(k)} = F_k * I_A \text{ and/or } I_B^{(k)} = G_k * I_B. \qquad (1)$$

Here the filters fulfill the condition $$\sum_{k=1}^{N} F_k \equiv 1,$$

so that $$\sum_{k=1}^{N} I_A^{(k)} = I_A$$

applies. Similarly this step is also implemented for the second x-ray spectrum B. Without limitation, k=1 corresponds to the frequency band with the lowest frequencies.

Step II: The local correlations between $I_A^{(k)}$ and $I_B^{(k)}$ are evaluated for all k>1. This can be realized for instance by way of unweighted or weighted cross correlation functions. In the example discussed here, a distance-weighted cross correlation function is used as follows:

$$c^{(k)}(x, y) := \frac{\sum_{m,n} w_{m,n}^{(k)} \left(I_A^{(k)}(x+m, y+n) - \bar{I}_A^{(k)}(x, y)\right) \cdot \left(I_B^{(k)}(x+m, y+n) - \bar{I}_B^{(k)}(x, y)\right)}{\sqrt{\sum_{m,n} w_{m,n}^{(k)} \left(I_A^{(k)}(x+m, y+n) - \bar{I}_A^{(k)}(x, y)\right)^2} \cdot \sqrt{\sum_{m,n} w_{m,n}^{(k)} \left(I_B^{(k)}(x, y) - \bar{I}_B^{(k)}(x, y)\right)^2}}, \quad (2)$$

with $w_{m,n}$ being a weighting function suited to the frequency band k, n and m describing the distance from location x, y of the respectively observed pixel and $\bar{I}^{(k)}(x,y)$ defining a local average value around the observed pixel.

This weighting function $w_{m,n}^{(k)}$ can be calculated for instance with:

$$w_{m,n}^{(k)} = \exp(-(m^2+n^2)/\sigma_k^2), \quad (3)$$

with $\sigma_k$ representing the local noise in the k'th local frequency band in the local area of the pixel coordinates x±m and y±n.

Furthermore, the local average value can also be defined as follows for instance, with this being calculated in each case for the spectra A and B:

$$\bar{I}^{(k)}(x, y) := \left(\sum_{m,n} w_{m,n}^{(k)} I^{(k)}(x+m, y+n)\right) / \sum_{m,n} w_{m,n}^{(k)}. \quad (4)$$

If $|c^{(k)}(x,y)| \ll 1$, $I_A^{(k)}$ and $I_B^{(k)}$ are therefore uncorrelated and a high level of noise is present. If $c^{(k)}(x,y) \to 1$ and/or $c^{(k)}(x,y) \to -1$ result, the maximum correlation and/or anticorrelation exists and the noise is minimal.

Step III: Modified images $\tilde{I}_A^{(k)}$ and $\tilde{I}_B^{(k)}$ can now be calculated using the local, band-dependent correlations such that for weak correlations, in other words with a high level of noise, and for strong correlations the average value image and the original image with its portion in the relevant spatial frequency band are then used respectively. The following then applies in each instance for the x-ray spectra A and B:

$$\tilde{I}^{(k)}(x,y) := \bar{I}^{(k)}(x,y) + \mu^{(k)}(x,y) \cdot (I^{(k)}(x,y) - \bar{I}^{(k)}(x,y)). \quad (5)$$

Here the weight μ is a function of c and the following applies for instance:

$$\mu^{(k)}(x,y) = |c^{(k)}(x,y)|. \quad (6)$$

Within the scope of the invention, other functions can also be used with the property μ=0 t c=0 and μ→1 for |c|→1.

In the observed region around the pixel, the band image is replaced, by way of the weighting, by a spatially smoothed value as a result of a minimal correlation of detected noise, i.e. noise is reduced.

Step IV: The final image is finally produced by summation of the modified band parts, $$I'(x, y) := I^{(1)}(x, y) + \sum_{k=2}^{N} \tilde{I}^{(k)}(x, y). \quad (7)$$

Compared with the original image, the new image, as desired, indicates a reduced noise while simultaneously retaining edges, as a result of the correlation-dependent weighting.

According to the afore-cited ideas, in at least one embodiment the inventors propose a method for the noise reduction of CT image data, which comprises the following methods steps:

scanning an examination object, generating at least two CT image data records on the basis of another x-ray energy spectrum in each instance, breaking the image data records down into at least two broken-down image data records in each instance with different spatial frequency bands with a lowest spatial frequency band, determining local and band-dependent correlations between the broken-down image data records with the same but not the lowest spatial frequency band, calculating at least one newly broken-down image data record in each instance using the local band-dependent correlations of the broken-down image data records, with a weighted average value of the pixel being formed from at least two pixel values of the broken-down image data records in the case of a weak local band-dependent correlation of a pixel, with the pixel value of the originally broken-down image record being used as a new pixel value in the case of a strong local correlation, and at least one new final image data record being calculated for at least one x-ray energy spectrum from the broken-down image data record with the lowest spatial frequency band and the at least one newly broken-down image data record of the same x-ray energy spectrum with the at least one higher spatial frequency band.

In at least one embodiment with this method, the image data records, which were reconstructed on the basis of differently observed x-ray energy spectra, are therefore broken down into different frequency bands. If significant noise is then present on the basis of an x-ray spectra-encompassing correlation examination, noise-optimized weighted image data is generated in an x-ray spectra-encompassing manner from the image data of the upper spatial frequency bands and the thus noise-optimized highfrequency image portions are combined with the low frequency image portions of the respective x-ray spectrum. New noise-reduced image data records are produced in this way; without the dual-energy information or the image intensity having noticeably suffered. Such image data can then be better used to determine multi spectra information, like for instance for a multi material component break-down.

The generation of several CT image data records on the basis of different x-ray energy spectra can be implemented on the one hand by the original scanning of an object using different x-ray energy spectra. There is however also the possibility, on the basis of a scanning using a single x-ray energy spectrum and a subsequent measurement of the absorption using an energy-selective detector, to generate dual-energy CT-images, with only one part of the measured energy spectrum being used here for each dual-energy CT-image.

In respect of the break-down of the image data records into different spatial frequency bands, it is proposed to execute this break-down on the one hand by filtering using different spatial frequency filters, with it additionally being advantageous to use spatial frequency filters which are standardized to 1 in terms of their total.

There is alternatively also the possibility of implementing the break-down of the image data records by means of a wavelet transformation, with the spatial frequency bands being determined by the plane of wavelet transformation.

Finally the break-down of the image data records by way of Fourier transformation can alternatively also be implemented, with the spatial frequency bands being determined by the Fourier coefficient assigned to a spatial frequency.

In respect of the afore-described break-down of the image data records by way of different methods, such as filtering, wavelet transformation, and Fourier transformation, reference is made by way of example to the patent application with file reference DE 10 2007 061 935.0, the entire contents of which are hereby incorporated herein by reference, with the afore-cited breakdown methods essentially being known to the person skilled in the art.

It is also advantageous for the local band-dependent correlation to be determined in a region around the location of the respective pixel into the broken-down image data records of the respective local frequency band of the at least two x-ray energy spectra. It is also favorable here for the local band-dependent correlation to be a weighted, in particular locally-dependent correlation function which is dependent in particular on the distance from the observed pixel.

It is also proposed to determine the local band-dependent correlation $c^{(k)}(x,y)$ according to the following formula:

$$c^{(k)}(x, y) := \frac{\sum_{m,n} w_{m,n}^{(k)} \left(I_A^{(k)}(x+m, y+n) - \bar{I}_A^{(k)}(x, y)\right) \cdot \left(I_B^{(k)}(x+m, y+n) - \bar{I}_B^{(k)}(x, y)\right)}{\sqrt{\sum_{m,n} w_{m,n}^{(k)} \left(I_A^{(k)}(x+m, y+n) - \bar{I}_A^{(k)}(x, y)\right)^2} \cdot \sqrt{\sum_{m,n} w_{m,n}^{(k)} \left(I_B^{(k)}(x, y) - \bar{I}_B^{(k)}(x, y)\right)^2}}$$

with $w_{m,n}^{(k)}$ representing a weighting function for the local frequency band k,
$\bar{I}^{(k)}(x,y)$ describing a local average value of the respectively observed pixel with:

$$\bar{I}^{(k)}(x, y) := \left(\sum_{m,n} w_{m,n}^{(k)} I^{(k)}(x+m, y+n)\right) \Big/ \sum_{m,n} w_{m,n}^{(k)}$$

and m, n describing the size of the respectively observed region around the position (x, y) of the pixel.

It is also proposed for the at least one final new image data record to be determined according to the following formula for at least one of the x-ray energy spectra:

$$I'(x, y) := I^{(1)}(x, y) + \sum_{k=2}^{N} \bar{I}^{(k)}(x, y).$$

In the case of a strong local correlation, the pixel value of the observed pixel can also be used for the final image data record from the input image data record, in order to reduce the computing time, without the computing process of a weighted noise optimization and recombination of the data from several spatial frequency bands having to be implemented for such pixels.

To determine a strong or weak local band-dependent correlation, a threshold value method can be used, in at least one embodiment, for instance for the determined values of $c^{(k)}(x, y)$. Here the threshold is either fixedly predetermined or the user of the method is also permitted a free determination of this threshold, if necessary observing the image sequence.

Aside from the afore-described method in its different forms of embodiment, the invention also includes an image processing system comprising a computer, which has a program memory in which the computer programs which execute the afore-described method during operation, are stored. Reference is made here to the fact that such an image processing system can naturally also be part of a computed tomography system and can if necessary be integrated in the control and computing unit of such a computed tomography system.

BRIEF DESCRIPTION OF THE DRAWINGS

The invention is described in more detail below with reference to a preferred example embodiment with the aid of the Figures, with only the features needed to understand the invention being shown here. Here the following reference characters and variables are essentially used: 1: dual-energy CT-system; 2: first x-ray tube; 3: first detector; 4: second x-ray tube (optional); 5: second detector (optional); 6: gantry housing; 7: patient; 8: moveable patient couch; 9: system axis; 10: control and computing system; E: energy; *$F_1$: high pass filter; *$F_2$: low pass filter; $\hat{F}_k$: filter function for the k'th frequency band; f: spatial frequency; $f^{(k)}$: k'th frequency band; $I_A$: dual-energy CT-image of the first spectrum A; $I_B$: dual-energy CT-image of the second spectrum B; $I_X^{(k)}$: broken-down image of the frequency band k from the spectrum X; $I'_A$: new image of the spectrum A; $I'_B$: new image of the spectrum B; $\mu_{X,Y}^{(k)}$: combining weight of the image portions; P: photon flow; $Prg_1$ to $Prg_n$: computer programs.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 1:
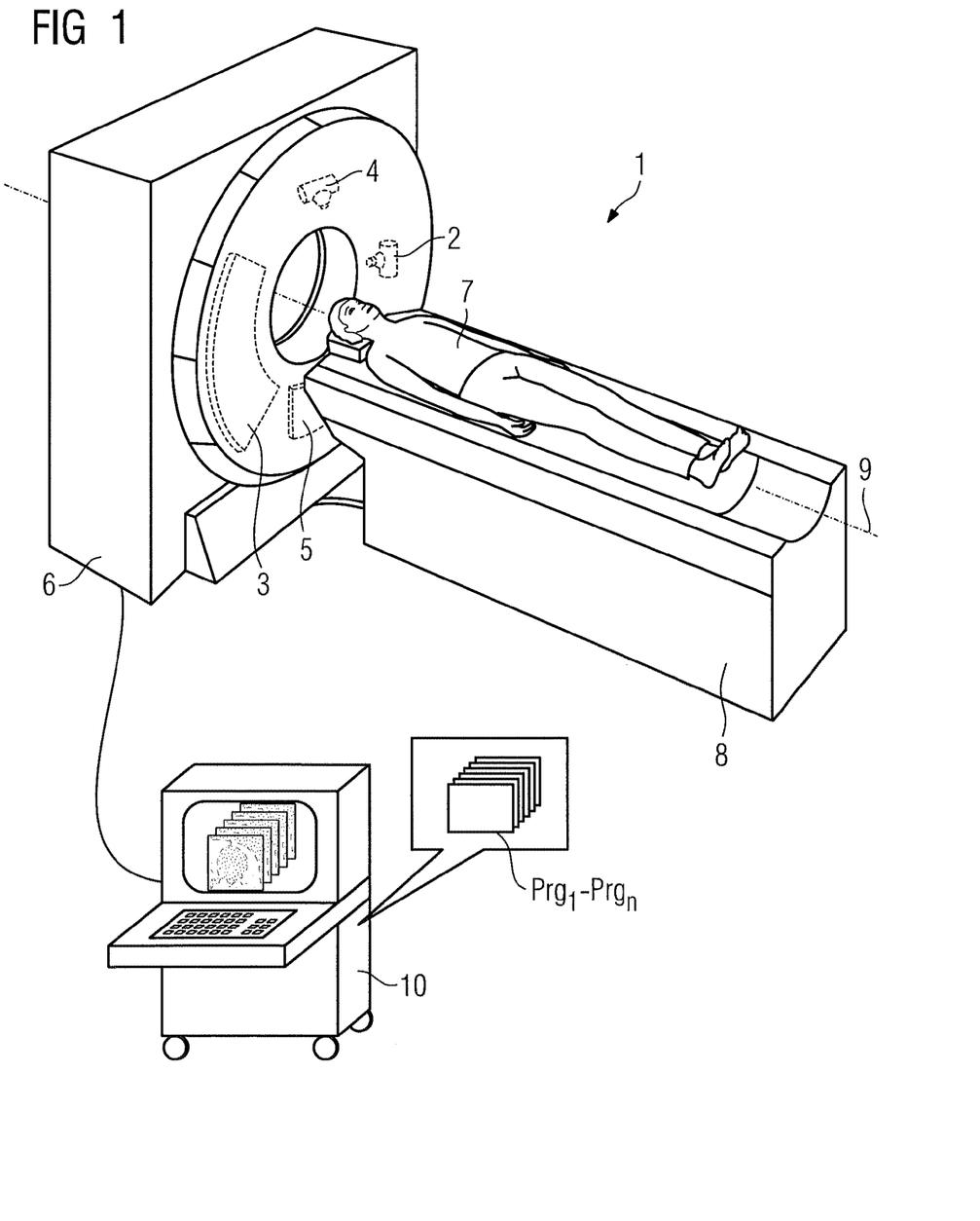
FIG. 1: shows in detail a dual-energy CT-system.

FIG. 1 shows a dual-energy CT-system 1 for implementing an embodiment of the inventive method, comprising a gantry housing 6, on which are arranged two emitter/detector systems, comprising a first x-ray tube 2 and an oppositely-located detector 3, also a second x-ray tube 4 and an oppositely-located detector 5, with it being possible for both emitter/detector systems to be operated with different x-ray energies and at the same time for an examination object, in particular a patient, here 7, to be scanned using different x-ray energy spectra. Such a patient 7 is continuously or sequentially moved during the scanning process along a system axis 9 through the measuring field of the CT system with the aid of a moveable patient couch 8 such that a scanning of the patient 7 can be implemented as a whole or in certain regions. The control of this CT system 1 can be implemented by the likewise schematically illustrated control and computer system 10, which contains a program memory, in which computer programs $Prg_1$ to $Prg_n$ are stored, which are executed during operation and can control both the operation of the CT system, and also image calculations, if necessary including an embodiment of the inventive method.

Figure 2:
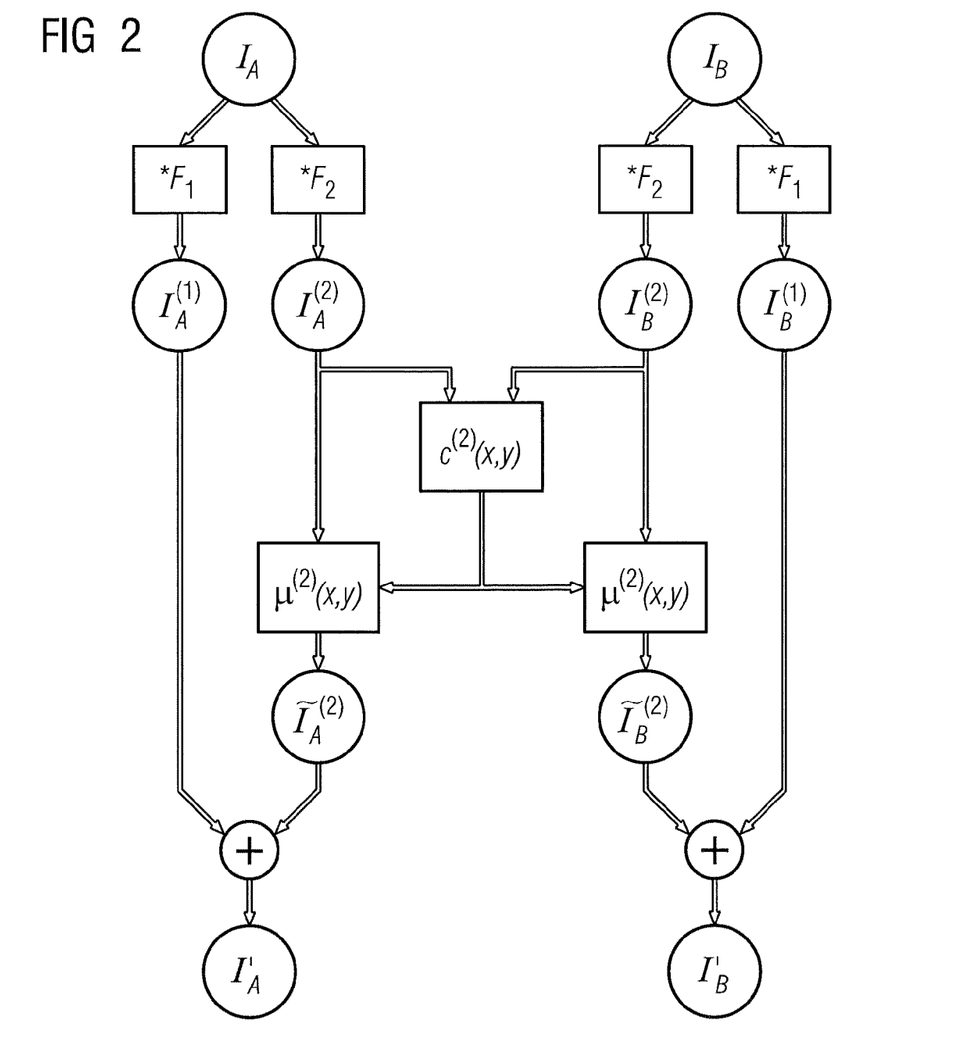
FIG. 2: shows in detail a schematic representation of an embodiment of an inventive method with the break-down of a dual-energy CT-image data record pair into two spatial frequency bands by way of filtering, determination of local correlations, noise optimization of the broken-down images of high spatial frequency bands and subsequent recombination.

An embodiment of the inventive method is shown by way of example for the calculation of two sectional images $I_A$ and $I_B$ of two spectra A and B in FIG. 2. These sectional images $I_A$ and $I_B$ are divided into two frequency bands with the aid of the filters $*F_1$ and $*F_2$, so that the broken-down image data records $I_A^{(1)}$, $I_A^{(2)}$ are produced from the input image $I_A$ and the two image data records $I_B^{(1)}$ und $I_B^{(2)}$ broken down according to their frequency bands are produced from the input image $I_B$. In accordance with the invention the correlation behavior, mostly the cross correlation, is now determined pixel by pixel in a predetermined region between the broken-down image data records $I_A^{(2)}$ and $I_B^{(2)}$. In the case of a good correlation, the respective pixel value remains unchanged. In the case of an unsatisfactory correlation, the pixel value is combined in a noise-optimized manner from both high frequency image data records in accordance with the illustrated weightings $\mu_{X,Y}^{(k)}$. Finally, the combination of the low frequency broken-down image data records $I_A^{(l)}$ and/or $I_B^{(l)}$ with the thus improved broken-down high frequency image data records $\tilde{I}_A^{(k)}$ and/or $\tilde{I}_B^{(k)}$ thus takes place to form to the new and final image data records $I'_A$ und $I'_B$.

Figure 3:
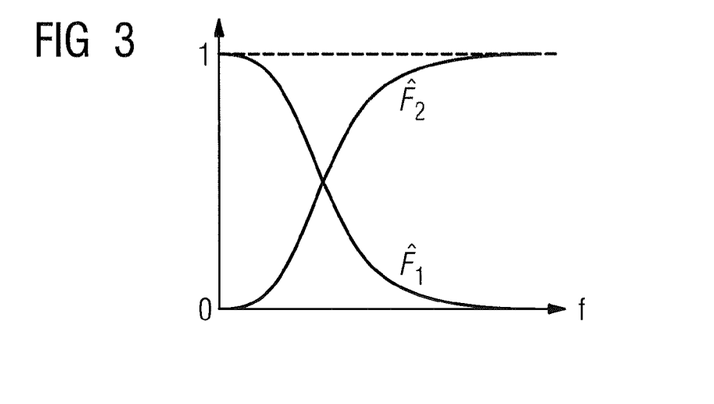
FIG. 3: shows in detail a frequency curve of two filters which complement one another for breaking down the image data records into two frequency bands.

FIG. 3 shows by way of example the course $\hat{F}_1$ and $\hat{F}_2$ of the frequency filter $F_1$ and/or $F_2$ between 0 and 1 across the spatial frequency f, as can be used in an embodiment of the method shown in FIG. 2.

Figure 4:
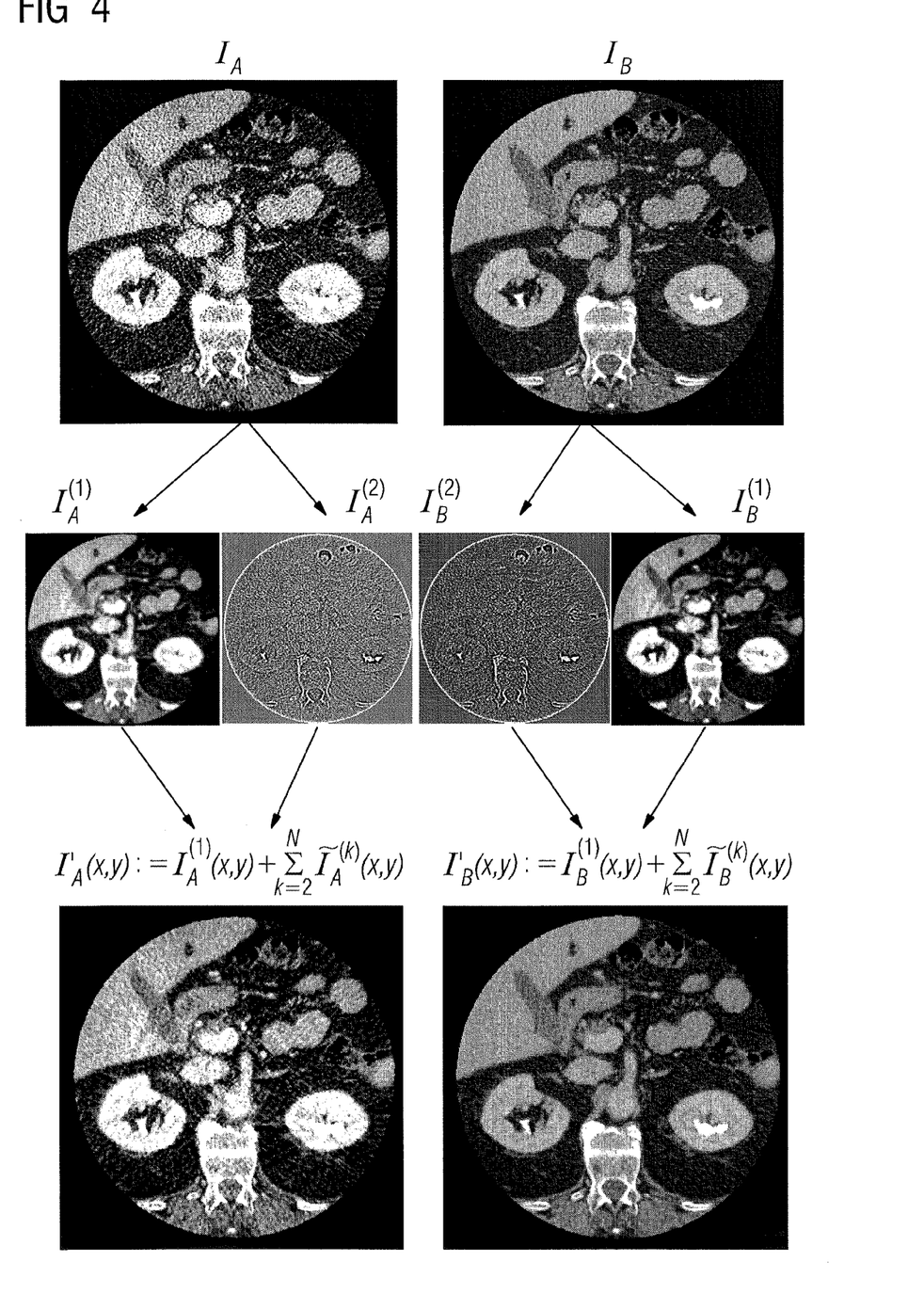
FIG. 4: shows in detail representations of a dual-energy CT-sectional image pair, of the sub images broken-down into two spatial frequency bands and of the final newly recombined image data records with reduced noise.

To better illustrate an embodiment of the method shown in FIG. 2, an embodiment of the method from FIG. 2 is once again shown in FIG. 4 on the image plane. The dual-energy image data record of a renal scan is shown above with the input images $I_A$ and $I_B$. $I_A$ corresponds to a CT recording with an acceleration voltage of 80 kVp and is relatively noisy. An object-identical CT recording with an acceleration voltage of 140 kVp is shown adjacent to the right. The noise is somewhat less here as a result of a somewhat higher dose used.

In accordance with an embodiment of the invention, these two input images $I_A$ and $I_B$ are separated into two frequency bands here by means of filtering. The result of such a separation is shown in the smaller image representations below. The image $I_A^{(1)}$ shown here corresponds to the image $I_A$ in the low frequency band, while the image $I_A^{(2)}$ corresponds to the image $I_A$ in the high frequency band. The same is shown adjacent to the right for image $I_B$, with the high frequency band being shown here to the left and the low frequency band being shown here to the right. The high frequency images thus broken down are examined pixel by pixel in terms of their correlation behavior in accordance with the inventive specification and are combined with one another in a noise-optimized weighted fashion. Finally, the broken-down and partially processed image data from the same x-ray spectrum with different spatial frequency bands is added to different spatial frequency bands in accordance with the represented formula so that new images $I'_A$ and $I'_B$ are produced. In the present example, a noise improvement by 35% was achieved by way of an embodiment of the inventive method.

These noise-improved image data records now allow the dual-energy information inserted into the image data records to be acquired considerably more effectively. For instance, material break-down calculations which are known per se can as a result be implemented considerably more effectively.

Figure 5:
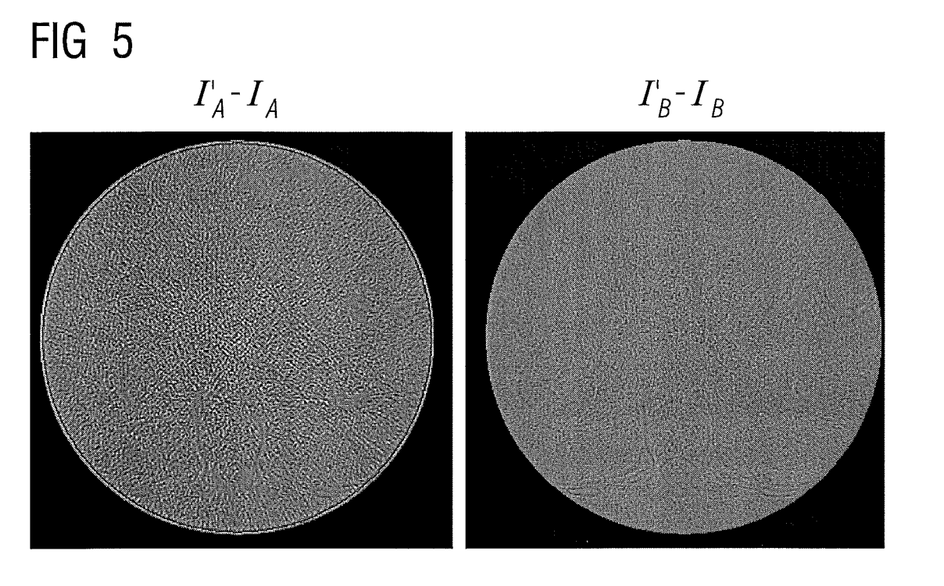
FIG. 5: shows in detail a comparison of the differential images from input image data records and final image data records per x-ray energy spectrum.

To illustrate the achieved noise reduction, FIG. 5 shows a comparison of the differential images $I'_A-I_A$ and $I'_B-I_B$ from input image data records and final image data records per x-ray energy spectrum A and B. On the one hand, the effect of de-noising can be clearly identified, with, in the event of the spectrum A, a noise reduction of approximately 35% having actually been achieved. In the case of the high energy spectrum B, this effect is correspondingly less as a result of the already somewhat lower noise level at the start.

Figure 6:
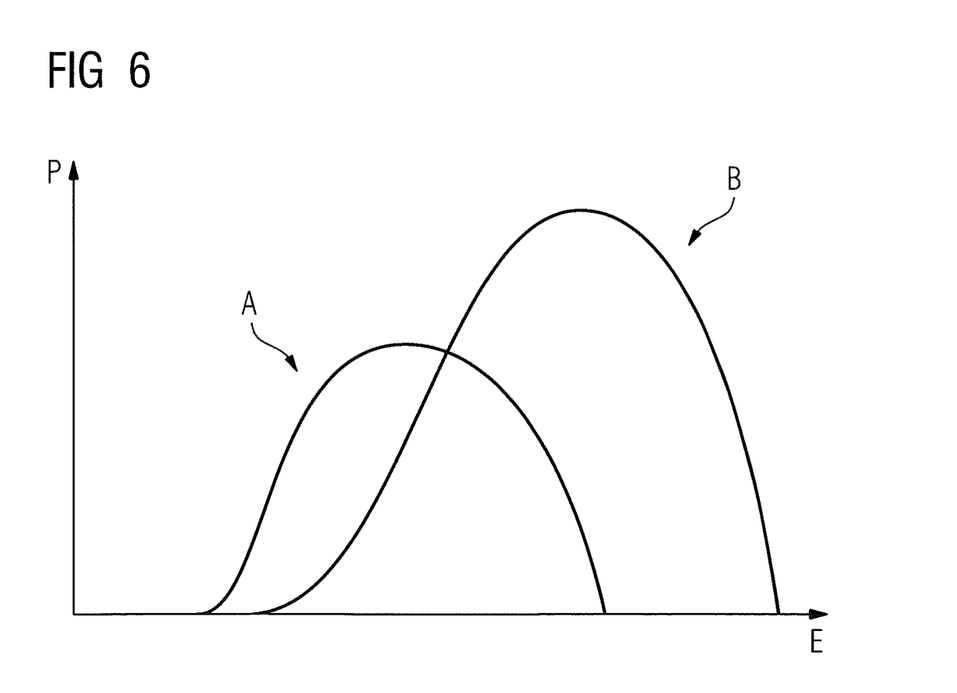
FIG. 6: x-ray energy spectra A and B.

Additionally, the spectra A used by way of example are shown in FIG. 6 with 80 kVp and B with 140 kVp. In this diagram, the photon flow P is plotted on the x axis above the energy on the y axis.

Reference is made in detail to the fact that an embodiment of the present method can not only be applied to CT sectional image data records but instead also to CT volume data records and that no limitation from image data records from only two energy ranges exists, instead image data records from several energy ranges can likewise be handled accordingly.

Furthermore, there is also the possibility of not only breaking the image data records down into two frequency ranges but instead into several spatial frequency ranges, with it being possible to treat each spatial frequency range individually in respect of its weighting.

It is apparent that the previously cited features of an embodiment of the invention can not only be used in the specified combination in each instance but also in other combinations or alone, without departing from the scope of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark)., cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE CHARACTERS 1 dual-energy CT-system
2 first x-ray tube
3 first detector
4 second x-ray tube (optional)
5 second detector (optional)
6 gantry housing
7 patient 8 moveable patient couch
9 system axis
10 control and computing system
E energy
*F$_1$ high pass filter
*F$_2$ low pass filter
$\hat{F}_k$ filter function for k'th frequency band
f spatial frequency
f$^{(k)}$ k-th frequency band
I$_A$ dual-energy CT-image of the first spectrum A
I$_B$ dual-energy CT-image of the second spectrum B
I$_X^{(k)}$ broken-down image of the frequency band k from the spectrum X
I'$_A$ new image of the spectrum A
I'$_B$ new image of the spectrum B
$\mu_{X,Y}^{(k)}$ combination weight of the image portions
P photon flow
Prg$_1$-Prg$_n$ computer programs

What is claimed is:

1. A method for noise reduction of computer tomography (CT) image data comprising:
    scanning an examination object;
    generating at least two CT images, each CT image being generated on the basis of a different x-ray energy spectrum, as an input image;
    breaking down each input image into at least two broken down image data records, each broken down image data record being associated with different spatial frequency bands;
    determining local band-dependent correlations between the broken-down image data records having the same but not a relatively lowest spatial frequency band;
    calculating at least one newly broken-down image data record by using the local band-dependent correlations of the at least two broken down image data records, with:
        a weighted average value of a pixel being formed from at least two pixel values of the at least two broken-down image data records if a local band-dependent correlation of a pixel is weaker than a threshold, and
        a pixel value of the corresponding one of the at least two broken-down image data records if a local band-dependent correlation of a pixel is stronger than the threshold; and
    calculating at least one new final image data record for at least one x-ray energy spectrum from the broken-down image data record with the relatively lowest spatial frequency band and the at least one newly broken-down image data record of the same X-ray energy spectrum.

2. The method as claimed in claim 1, wherein the scanning scans the examination object based on different x-ray energy spectra.

3. The method as claimed in claim 1, wherein the generating generates the at least two CT images using at least one energy-selective detector, and
    only one part of the energy spectrum detected by the at least one energy-selective detector is evaluated for generating each of the at least two CT images.

4. The method as claimed in claim 1, wherein the breaking down of the input images includes:
    filtering each of the input images with different spatial frequency filters.

5. The method as claimed in claim 4, wherein the spatial frequency filters used are standardized to 1.

6. The method as claimed in claim 1, wherein the breaking down of the input images includes:
    applying wavelet transformation to each of the input images, wherein
    the spatial frequency bands are determined by a plane of the wavelet transformation.

7. The method as claimed in claim 1, wherein the breaking down of the input images includes:
    applying Fourier transformation to each of the input images, wherein
    the spatial frequency bands are determined by Fourier coefficients assigned to a local frequency.

8. The method as claimed in claim 1, wherein the local band-dependent correlation is determined in a range around the location of the respective pixel in the broken-down image data records of the respective spatial frequency band of at least two x-ray energy spectrum with which the at least two CT images are generated.

9. The method as claimed in claim 1, wherein the determining the local band-dependent correlations determines the local band-dependent correlations based on a weighted correlation function.

10. The method as claimed in claim 1, wherein the local band-dependent correlations are denoted by ($c^{(k)}(x,y)$), and
    the determining the local band-dependent correlations determines the local band-dependent correlations according to a formula, the formula being:

$$c^{(k)}(x,y) := \frac{\left( \sum_{m,n} w_{m,n}^{(k)} \left(I_A^{(k)}(x+m, y+n) - \bar{I}_A^{(k)}(x,y)\right) \cdot \left(I_B^{(k)}(x+m, y+n) - \bar{I}_B^{(k)}(x,y)\right) \right)}{\left( \sqrt{\sum_{m,n} w_{m,n}^{(k)} \left(I_A^{(k)}(x+m, y+n) - \bar{I}_A^{(k)}(x,y)\right)^2} \cdot \sqrt{\sum_{m,n} w_{m,n}^{(k)} \left(I_B^{(k)}(x,y) - \bar{I}_B^{(k)}(x,y)\right)^2} \right)}$$

with $w_{m,n}^{(k)}$ representing a weight function for the spatial frequency band k,
$\bar{I}^{(k)}(x,y)$ describing a local average value of the pixel observed in each instance with:

$$\bar{I}^{(k)}(x,y) := \left( \sum_{m,n} w_{m,n}^{(k)} I^{(k)}(x+m, y+n) \right) / \sum_{m,n} w_{m,n}^{(k)}$$

and m, n describing a size of the respectively observed range around the position (x, y) of the pixel.

11. The method as claimed in claim 1, wherein the at least one final new image data record is denoted by (I'$_A$, I'$_B$), and
    the determining the at least one final new image data record determines the at least one final new image data record according to a formula for at least one of the x-ray energy spectra, the formula being:

$$I'(x,y) := I^{(1)}(x,y) + \sum_{k=2}^{N} \bar{I}^{(k)}(x,y).$$

12. An image processing system for noise reduction of computer tomography (CT) image data, comprising:
    a computer; and
    a processor configured to implement the method as claimed in claim 1.

13. The method as claimed in claim 2, wherein the generating generates the at least two CT images using at least one energy-selective detector associated with one of the different x-ray energy spectra, and only one part of the energy spectrum detected by the at least one energy-selective detector is evaluated for generating each of the at least two CT images.

14. A non-transitory computer readable medium including a program product, the computer program product comprising instructions, which when executed by a processor, causes the processor to implement the method of claim 1.

* * * * *